(12) United States Patent
Xia et al.

(10) Patent No.: US 8,356,107 B2
(45) Date of Patent: Jan. 15, 2013

(54) METHOD, APPARATUS AND SYSTEM FOR UPDATING PCC RULES

(75) Inventors: Xu Xia, Shenzhen (CN); Yan Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 12/908,386

(22) Filed: Oct. 20, 2010

(65) Prior Publication Data

US 2011/0035782 A1 Feb. 10, 2011

Related U.S. Application Data

(63) Continuation of application No. PCT/CN2009/071426, filed on Apr. 23, 2009.

(30) Foreign Application Priority Data

Apr. 25, 2008 (CN) .......................... 2008 1 0096056

(51) Int. Cl.
*G06F 15/16* (2006.01)
(52) U.S. Cl. ....................................................... 709/229
(58) Field of Classification Search .................. 709/229, 709/223, 225, 226, 227
See application file for complete search history.

(56) References Cited

U.S. PATENT DOCUMENTS

| | | | |
|---|---|---|---|
| 2008/0232376 A1* | 9/2008 | Huang et al. | 370/395.3 |
| 2008/0256251 A1* | 10/2008 | Huotari et al. | 709/229 |
| 2010/0217855 A1* | 8/2010 | Przybysz et al. | 709/223 |

FOREIGN PATENT DOCUMENTS

| | | | |
|---|---|---|---|
| CN | 1996860 A | | 7/2007 |
| CN | 1996860 A | * | 7/2007 |
| CN | 101127694 A | | 2/2008 |
| CN | 101394449 A | | 3/2009 |
| CN | 101431420 A | | 5/2009 |
| EP | 2104270 A1 | | 9/2009 |
| WO | WO 2007/137522 A1 | | 12/2007 |

OTHER PUBLICATIONS

Written Opinion of the International Searching Authority (translation) dated (mailed) Aug. 6, 2009, issued in related Application No. PCT/CN2009/071426, filed Apr. 23, 2009, Huawei Technologies Co., Ltd.

Rejection Decision dated (mailed) Jan. 31, 2011, issued in related Chinese Application No. 200810096056.6 Huawei Technologies Co., LTD.

First Chinese Office Action dated (mailed) Feb. 12, 2010, issued in related Chinese Application No. 200810096056.6 Huawei Technologies Co., LTD.

(Continued)

*Primary Examiner* — Joseph Avellino
*Assistant Examiner* — Marshall McLeod
(74) *Attorney, Agent, or Firm* — Conley Rose, P.C.; Grant Rodolph

(57) ABSTRACT

A method, an apparatus, and a system for updating PCC rules are disclosed herein to ensure normal process of the user service in the process of updating the PCC rules. A method for updating PCC rules includes: obtaining a response made by a PCEF after the PCEF updates the PCC rules; and keeping consistency between PCC rules stored in the PCRF and the PCC rules currently executed in the PCEF according to the obtained response.

6 Claims, 10 Drawing Sheets

OTHER PUBLICATIONS

International Search Report for International Application No. PCT/CN2009/071426, mailed Aug. 6, 2009 Huawei Technologies Co., Ltd.

"3GPP TS 23.203 v8.0.0 Technical Specification Group Services and System Aspects; Policy and Charging Control Architecture (Release 8)", Dec. 2007.

3GPP, "Digital cellular telecommunications system (Phase 2+); Universal Mobile Telecommunications Systems (UMTS); Policy and charging control signalling flows and Quality of Service (QoS) parameter mapping (3GPP TS 29.213 version 7.4.0 Release 7)", ETSI TS 129 213, V7.4.0, pp. I and 1-64, (Apr. 2008).

3GPP, "Digital cellular telecommunications system (Phase 2+); Universal Mobile Telecommunications System (UMTS); Policy and charging control architecture (3GPP TS 23.203 version 7.6.0 Release 7)", ETSI TS 123 203, V7.6.0, pp. i and 1-73, (Apr. 2008).

3GPP, "Universal Mobile Telecommunications Systems (UMTS); Policy and charging control over Gx reference point (3GPP TS 29.212 version 7.4.0 Release 7)", ETSI TS 129 212, V7.4.0 pp. i and 1-44, (Apr. 2008).

Extended European Search Report from the European Patent Office for European Application No. 09 73 5049, mailed Jan. 14, 2011.

3GPP TSG-CT WG3 Meeting #47bis Sophia Antipolis, France, Change Request, C3-080335, pp. 1-9, (Mar. 31-Apr. 3, 2008).

3GPP TSG-CT WG3 Meeting #48, Cape Town South Africa, "Discussion on the consistency of PCC handling procedures between PCRF and PCEF", Huawei, pp. 1-2 (May 5-9, 2008).

3GPP TSG-CT WG3 Meeting #51, San Antonio, USA, Change Request, C3-090031, pp. 1-9, (Feb. 9-19, 2009).

3GPP TSG-CT WG3 Meeting #51, San Antonio, US, Change Request, C3-090436, pp. 1-15, (Feb. 9-19, 2009).

3GPP TSG SA WG2 Meeting #70, Scottsdale, Phoenix, USA, Change Request, S2-090661, pp. 1-3, (Jan. 12-16, 2009).

3GPP TSG-CT WG3 Meeting #47bis (C3-080335); Sophia Antipolis, France Mar. 31-Apr. 3, 2008; (9 pgs.).

Grgic, Tomislav et al.; "Resource authorization in IMS with known multimedia service adaptation capabilities"; University of Zagreb, Faculty of Electrical Engineering and Computing, Unska 3, HR-1000 Zagreb, Croatia (10 pgs.), available in book "New Directions in Intelligent Interactive Multimedia," http://dblp.uni-trier.de/db/series/sci/sci142.html, 2008.

Communication from a foreign counterpart application, Chinese Application No. 200810096056.6, Partial English translation, Notification of Reexamination dated Sep. 21, 2012, 6 pages.

Communication from a foreign counterpart application, Chinese Application No. 200810096056.6, Notification of Reexamination dated Sep. 21, 2012, 8 pages.

* cited by examiner

METHOD, APPARATUS AND SYSTEM FOR UPDATING PCC RULES

CROSS-REFERENCE TO RELATED APPLICATIONS

This application is a continuation of International Application No. PCT/CN2009/071426, filed on Apr. 23, 2009, which claims priority to Chinese Patent Application No. 200810096056.6, filed on Apr. 25, 2008, both of which are hereby incorporated by reference in their entireties.

FIELD OF THE INVENTION

The present invention relates to communications technologies, and in particular, to a method, a system, and an apparatus for updating Policy and Charging Control (PCC) rules.

BACKGROUND OF THE INVENTION

With the rapid development of communications technologies, communications networks are evolving toward all-IP multimedia networks. Service providers are developing communications services based on Internet Protocol (IP) networks, for example, multimedia call, file downloading, web page browse, and Video on Demand (VoD). Different services require different levels of Quality of Service (QoS), and the charging requirements thereof are also different. The network provides services of different QoS levels for the users according to the service type and the subscription level of the user, detects different service streams, and reports the charging information such as traffic and duration to the charging center for the purpose of charging. In order to tackle issues related to QoS and implement stream-based charging, the 3rd Generation Partnership Project (3GPP) defines a PCC architecture which enables the network to detect different service streams, to exercise QoS control, and to collect charging statistics according to different service streams.

The PCC architecture defined by the 3GPP is shown in FIG. 1. Primarily, a Policy Control and Charging Rules Function (PCRF), a Policy and Charging Enforcement Function (PCEF), and a Gx interface between the PCRF and the PCEF are introduced below.

The PCRF decides the corresponding PCC rules according to the restrictive conditions for a user to access the network, service provider policy, subscription profile, and underway service information, and sends the PCC rules to the PCEF through a Gx interface. The PCEF executes the PCC rules. The PCC rules include: rule of detecting the service data stream (for example, voice IP stream collection), access control, QoS for the service data, and stream-based charging rule.

The PCEF executes the PCC rules delivered by the PCRF through the Gx interface or the specified PCC rules. Specifically, the PCEF detects and measures the service data streams, ensures the QoS of the service data streams, process the user-plane traffic, and trigger the control-plane session management. The PCEF is categorized functionally. Specifically, a PCEF may be a Gateway GPRS Support Node (GGSN) or a Gateway (GW).

The Gx interface is based on the Diameter protocol defined by the Internet Engineering Task Force (IETF).

The Gx interface enables the PCRF to dynamically control the PCC rules executed on the PCEF. The Gx interface is configured to: create, maintain and terminate an IP Connectivity Access Network (IP-CAN) session, enable the PCEF to request PCC rules from the PCRF and enable the PCRF to send the PCC rules to the PCEF, and negotiate the IP-CAN bearer creation mode.

In the prior art, the PCRF delivers PCC rules to the PCEF through the Gx interface and update the PCC rules in either a PULL mode or a PUSH mode.

In the PULL mode, as shown in FIG. 2, the PCEF delivers PCC rules as follows:

1. When an event-trigger event occurs, the PCEF sends a Credit Control Request (CCR) message that carries an event-trigger parameter to the PCRF, requesting to deliver PCC rules.

2. The PCRF judges whether to update the PCC rules (namely, old PCC rules) according to the event-trigger, and returns a Credit Control Answer (CCA) message to the PCEF. If the PCC rules need update, the retuned CCA message carries the updated PCC rules (namely, new PCC rules), and the PCRF stores both the old PCC rules and the new PCC rules.

3. After receiving the CCA message, the PCEF executes the PCC rules. If the returned CCA message carries the new PCC rules, the PCEF executes the new PCC rules; if the returned CCA message carries no new PCC rules, the PCEF executes the old PCC rules. When the PCEF executes the PCC rules unsuccessfully, the PCEF sends a new CCR message.

In the PUSH mode, as shown in FIG. 3, the PCRF delivers PCC rules, as detailed below:

1. When an event-trigger event occurs, the PCRF updates the PCC rules, and sends a Re-Auth Request (RAR) message to the PCEF. The RAR message carries new PCC rules, and the PCRF does not store the old PCC rules.

2. The PCEF executes the new PCC rules delivered through the RAR message. After completion of the execution, the PCEF sends a Re-Auth Answer (RAA) message to the PCRF.

If the old PCC rules are retained, the PCRF needs to retain both new and old PCC state information, and retain the corresponding state information according to the response from the PCEF. However, in the case of updating PCC rules in the PULL mode, the PCRF adjusts the state of the stored new and old PCC rules according to the new CCR message sent by the PCEF only when the PCEF executes the new PCC rules unsuccessfully. If the PCEF executes the new PCC rules successfully, the PCEF sends no new CCR message to the PCRF, and the PCRF is unable to adjust the state of the stored new and old PCC rules, and it is impossible to keep consistency between the PCC rules stored in the PCRF and the PCC rules in the PCEF. In the subsequent interaction between the PCEF and the PCRF, the PCRF is unable to judge the PCC rules for delivery correctly, and the user service is interrupted.

If the PCRF stores no old PCC rules, regardless of the PULL mode or PUSH mode, the PCEF lacks the process of deactivating the old PCC rules, and the old PCC rules on the PCEF are still active; however, the old PCC rules on the PCRF are deactivated. In this case, the PCC rules stored in the PCRF are not consistent with the PCC rules stored in the PCEF, and the user service cannot go on normally.

SUMMARY OF THE INVENTION

The embodiments of the present invention provide a method for updating PCC rules to ensure normal process of the user service in the process of updating the PCC rules.

In order to fulfill the preceding objective, the method for updating PCC rules includes:

obtaining, by a Policy Control and Charging Rules Function (PCRF), a response made by a PCEF after the PCEF updates the PCC rules; and keeping, by the PCRF, consistency between PCC rules stored in the PCRF and the PCC rules executed in the PCEF according to the obtained response.

The embodiments of the present invention provide an apparatus for updating PCC rules to ensure normal process of the user service in the process of updating the PCC rules.

In order to fulfill the foregoing objective, the apparatus for updating PCC rules includes:

a response obtaining unit, configured to obtain a response made by a PCEF after the PCEF updates the PCC rules; and a PCC rule processing unit, configured to keep consistency between PCC rules stored in a Policy Control and Charging Rules Function (PCRF) and the PCC rules in the PCEF according to the obtained response.

The embodiments of the present invention provide a system for updating PCC rules to ensure normal process of the user service in the process of updating the PCC rules.

In order to fulfill the foregoing objective, the system for updating PCC rules includes:

a PCEF, configured to send a response to a PCRF after updating the PCC rules, wherein the PCRF is configured to: obtain the response made by the PCEF after the PCEF updates the PCC rules, and keep consistency between PCC rules stored in the PCRF and the PCC rules in the PCEF according to the obtained response.

In the embodiments of the present invention, after the PCEF updates the PCC rules, the PCRF can obtain the response made by the PCEF, and process the PCC rules stored in the PCRF according to the obtained response. In this way, the PCC rules in the PCRF keep consistent with the PCC rules executed in the PCEF. It is avoided that the user service is interrupted due to inconsistency between the PCC rules in the PCRF and the PCC rules in the PCEF in the process of updating the PCC rules in the prior art. The embodiments of the present invention ensure normal process of the user service in the process of updating the PCC rules.

DETAILED DESCRIPTION OF THE EMBODIMENTS

To describe the technical solution under the present invention more clearly, the following elaborates the embodiments of the present invention with reference to accompanying drawings. Apparently, only some of the embodiments of the present invention are described herein. Persons of ordinary skill in the art can derive other embodiments of the present invention from such embodiments without creative efforts.

In the prior art, the user service tends to be interrupted due to inconsistency between the PCC rules created in the PCRF and the PCC rules in the PCEF. In order to overcome such a problem, the embodiments of the present invention provide a method, an apparatus, and a system for updating PCC rules so that the user service runs normally in the process of updating the PCC rules.

Figure 1:
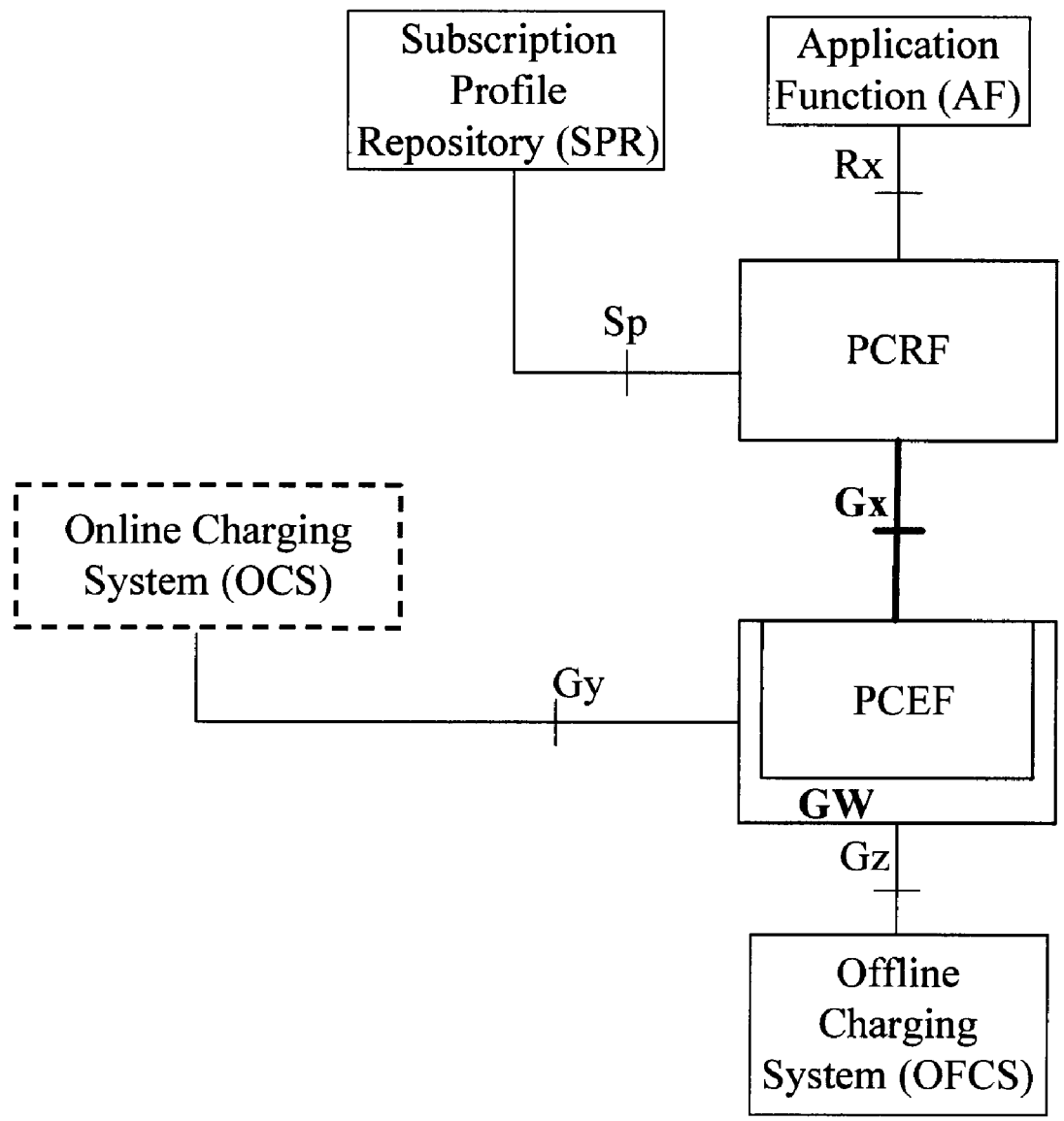
FIG. 1 shows a structure of a PCC architecture in the prior art.
Figure 2:
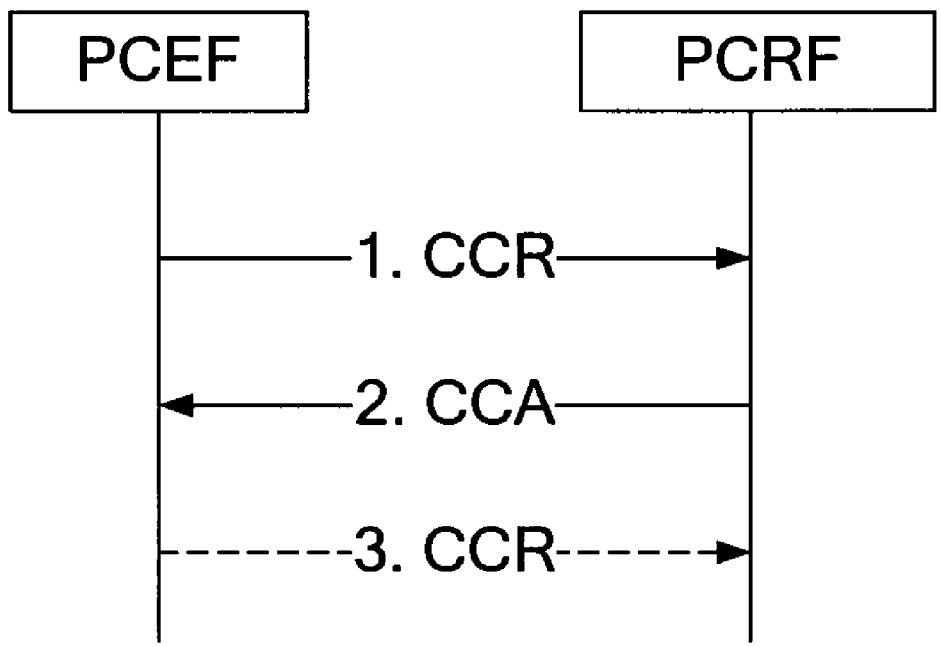
FIG. 2 shows how to update PCC rules in a PULL mode in the prior art.
Figure 3:
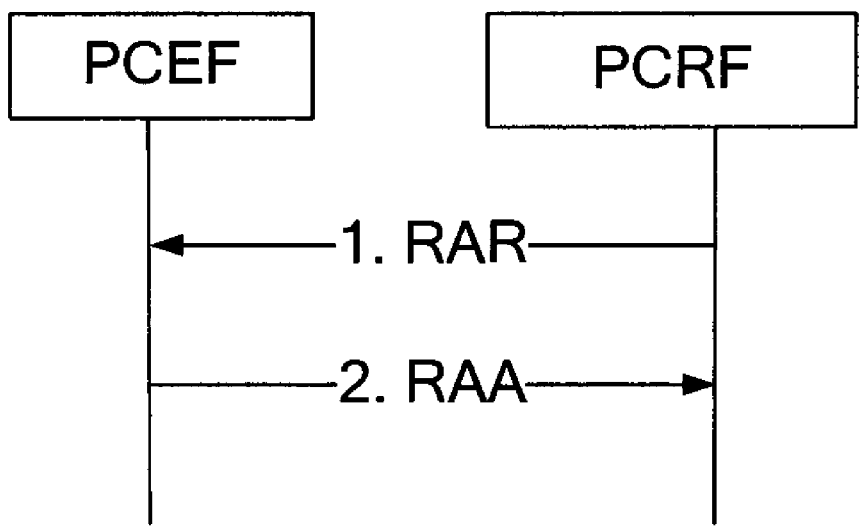
FIG. 3 shows how to update PCC rules in a PUSH mode in the prior art.
Figure 4:
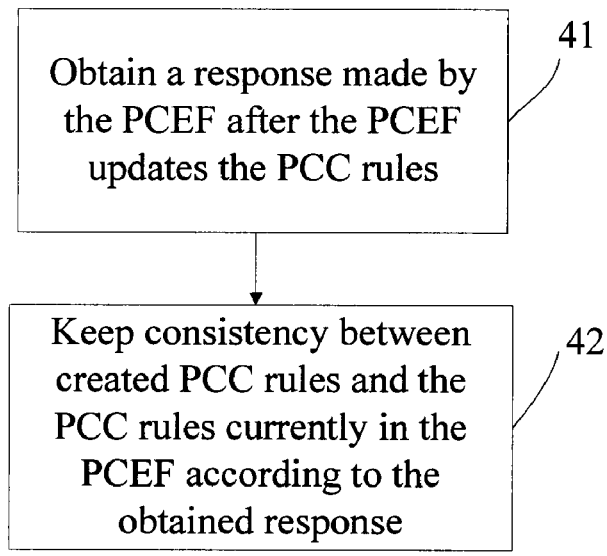
FIG. 4 is a flowchart of a method for updating PCC rules in an embodiment of the present invention.

As shown in FIG. 4, a method for updating PCC rules in an embodiment of the present invention includes:

Step 41: A response made by a PCEF is obtained after the PCEF updates the PCC rules.

Step 42: The created PCC rules and the PCC rules in the PCEF are kept consistent according to the obtained response.

In the embodiments of the present invention, after the PCEF updates the PCC rules, the PCRF can obtain the response made by the PCEF, and process the PCC rules created and stored in the PCRF according to the obtained response. In this way, the PCC rules stored in the PCRF keep consistent with the PCC rules in the PCEF. It is avoided that the user service is interrupted due to inconsistency between the PCC rules created in the PCRF and the PCC rules in the PCEF in the process of updating the PCC rules in the prior art. The embodiments of the present invention ensure normal process of the user service in the process of updating the PCC rules.

The embodiments of the present invention are further described in detail below.

FIRST EMBODIMENT

In the update process, if both new and old PCC rules are stored, the process of obtaining the response made by the PCEF includes the following steps:

In the PULL mode, the PCRF receives an answer message from the PCEF. The answer message is a CCR message which indicates success of updating the PCC rules.

Figure 5A:
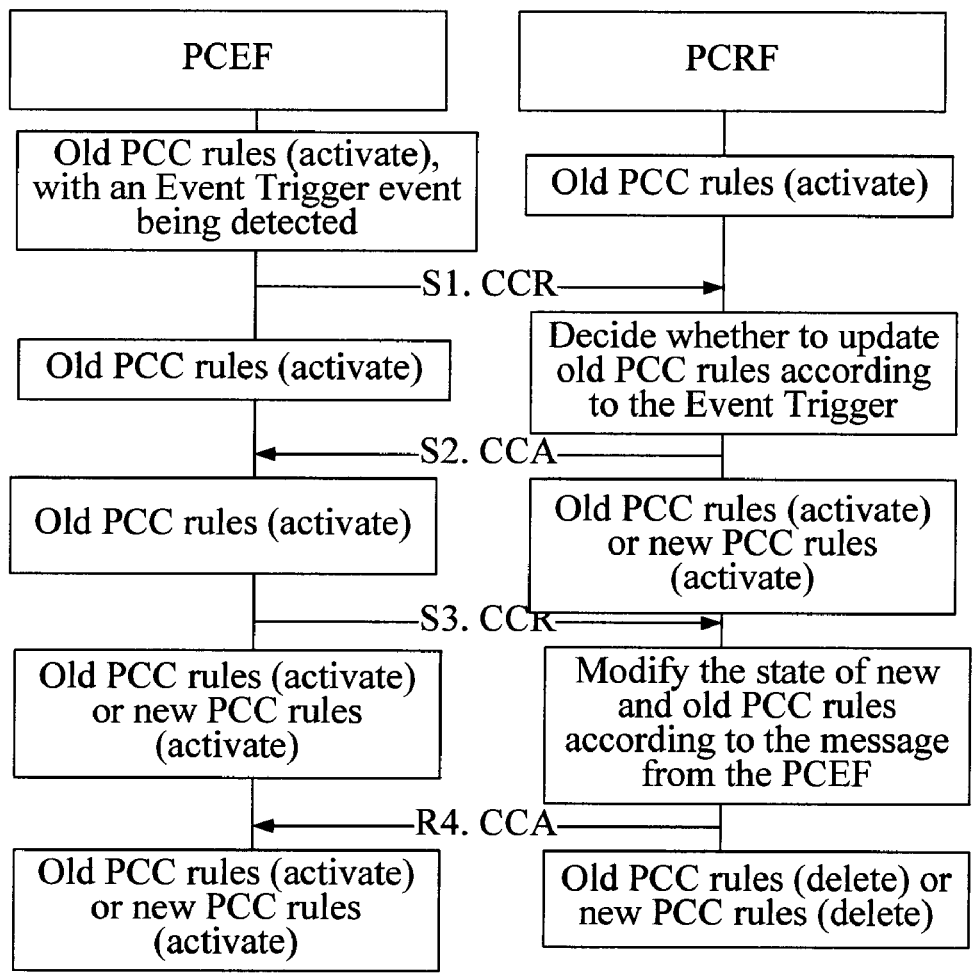
FIG. 5(a) shows a method for updating PCC rules according to a first embodiment of the present invention.

As shown in FIG. 5(a), a method for updating PCC rules in the first embodiment of the present invention includes:

Step S1: When an event-trigger event occurs, the PCEF sends a CCR message that carries an event-trigger parameter and a PCC rule delivery request.

Step S2: According to the event-trigger parameter, the PCRF judges whether the activated PCC rules (namely, old PCC rules) need to be updated, and sends a CCA. If the PCC rules need to be updated, the PCRF creates new PCC rules, and the CCA message delivered to the PCEF carries the updated PCC rules (namely, new PCC rules). The PCRF stores both the old PCC rules and the new PCC rules. This embodiment primarily deals with the scenario that the PCC rules need to be updated.

Step S3: After receiving the CCA message, the PCEF executes the new PCC rules carried in the CCA message. The PCEF sets the current PCC rules (namely, old PCC rules) to a non-active state (if the returned CCA message carries no new PCC rules, the current PCC rules are in the active state, namely, the old PCC rules are in the active state).

In order to ensure the PCRF to adjust the state of the stored new and old PCC rules, this embodiment uses a handshake mechanism. No matter whether the PCEF executes the new PCC rules successfully or not, the PCEF sends a new CCR message that carries the execution result to the PCRF upon receiving a CCA message. The new CCR message indicates whether to adjust the state of the new and old PCC rules.

Step S4: The PCRF processes the stored new and old PCC rules according to the new CCR message. If the PCEF executes the new PCC rules successfully, the CCR message instructs the PCRF to delete the old PCC rules and activate the new PCC rules; if the PCEF executes the new PCC rules unsuccessfully, the CCR message instructs the PCRF to delete the new PCC rules and activate the old PCC rules to keep consistency between the PCC rules stored in the PCRF and the PCC rules in the PCEF. Meanwhile, the PCRF sends a CCA message that carries the execution result to the PCEF.

In this embodiment, the new PCC rules and the old PCC rules are the same PCC rules at different stages. That is, the PCC rules before update are old PCC rules, and the PCC rules after update are new PCC rules, hereinafter the same being applicable.

SECOND EMBODIMENT

In the update process, if both new and old PCC rules are stored, the process of obtaining the response made by the PCEF includes the following steps:

In the PULL mode, the PCRF receives an answer message from the PCEF. The answer message is a CCR message which indicates failure of updating the PCC rules.

Figure 5B:
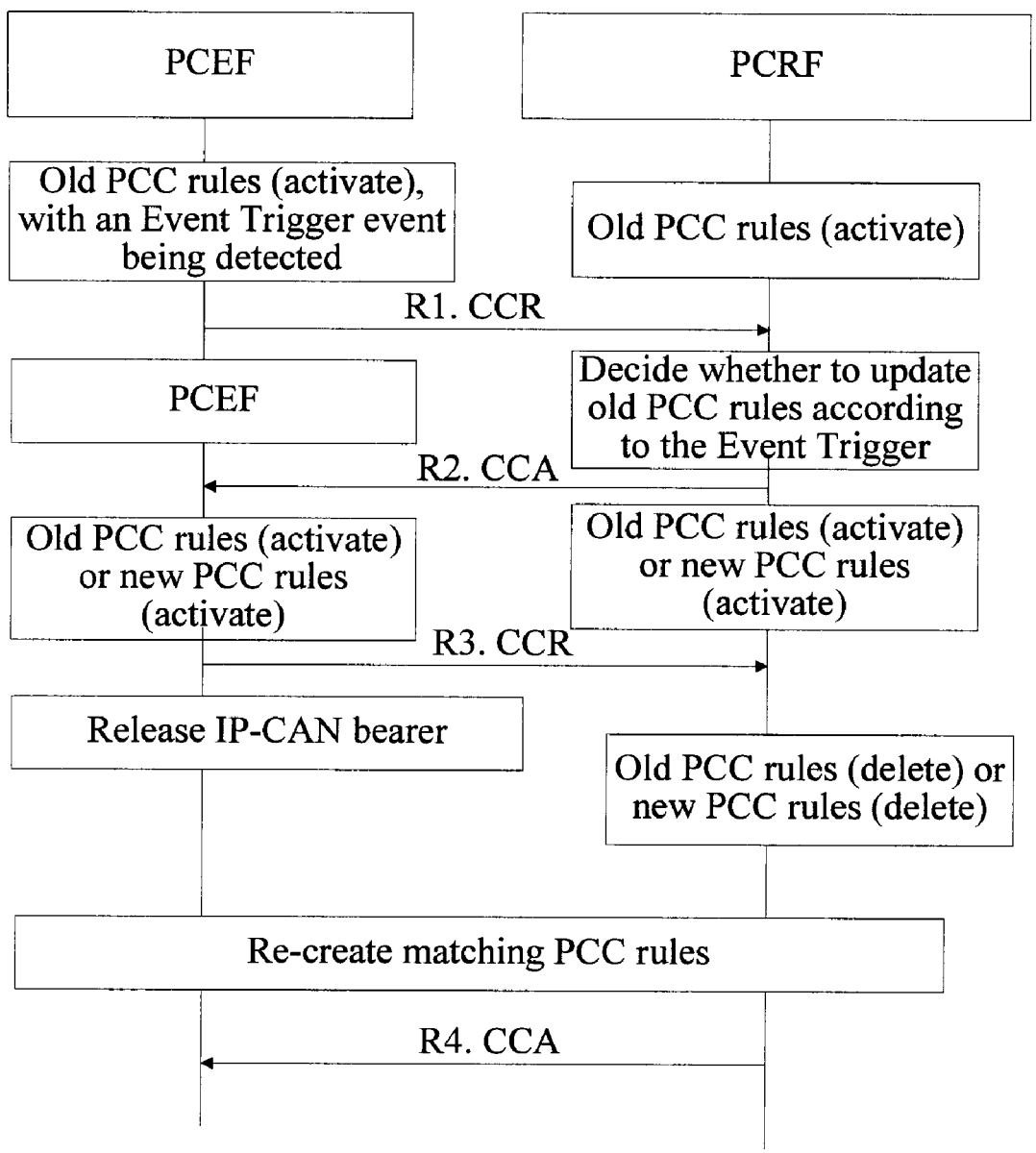
FIG. 5(b) shows a method for updating PCC rules according to a second embodiment of the present invention.

As shown in FIG. 5(b), a method for updating PCC rules in the second embodiment of the present invention includes:

Step R1: When an event-trigger event occurs, the PCEF sends a CCR message that carries an event-trigger parameter and a PCC rule delivery request.

Step R2: According to the event-trigger parameter, the PCRF judges whether the activated PCC rules (namely, old PCC rules) need to be updated, and sends a CCA. If the PCC rules need to be updated, the PCRF generates new PCC rules, and the CCA message delivered to the PCEF carries the updated PCC rules (namely, new PCC rules). The PCRF stores both the old PCC rules and the new PCC rules.

Step R3: After receiving the CCA message, the PCEF executes the new PCC rules carried in the CCA message. The PCEF sets the current PCC rules (namely, old PCC rules) to a non-active state (if the returned CCA message carries no new PCC rules, the current PCC rules are in the active state, namely, the old PCC rules are in the active state). In the embodiments of the present invention, the PCEF updates the PCC rules unsuccessfully, the new PCC rules in the PCEF are in the deactivated state, and the old PCC rules in the PCEF are in the activated state.

Step R4: The PCEF sends a new CCR message that carries the execution result to the PCRF. The PCRF processes the stored new and old PCC rules according to the new CCR message. In the embodiments of the present invention, the CCR message instructs the PCRF to delete the new PCC rules and the old PCC rules. While sending the CCR message, the PCEF releases or modifies the IP-CAN bearer corresponding to the old PCC rules to deactivate the old PCC rules. In this case, both new and old PCC rules in the PCEF are deactivated, and both new and old PCC rules in the PCRF are deleted. Those skilled in the art may use the prior art to re-create the PCC rules that match the PCEF. The PCRF sends a CCA message that carries the execution result to the PCEF. The CCA message carries the re-created PCC rules. Therefore, the PCC rules stored in the PCRF keep consistent with the PCC rules in the PCEF.

THIRD EMBODIMENT

In the update process, if both new and old PCC rules are stored, the process of obtaining the response made by the PCEF includes the following steps:

In the PULL mode, the PUSH mechanism is adopted, and the PCRF receives an answer message from the PCEF. The answer message is an RAA message which indicates success of updating the PCC rules.

Figure 6:
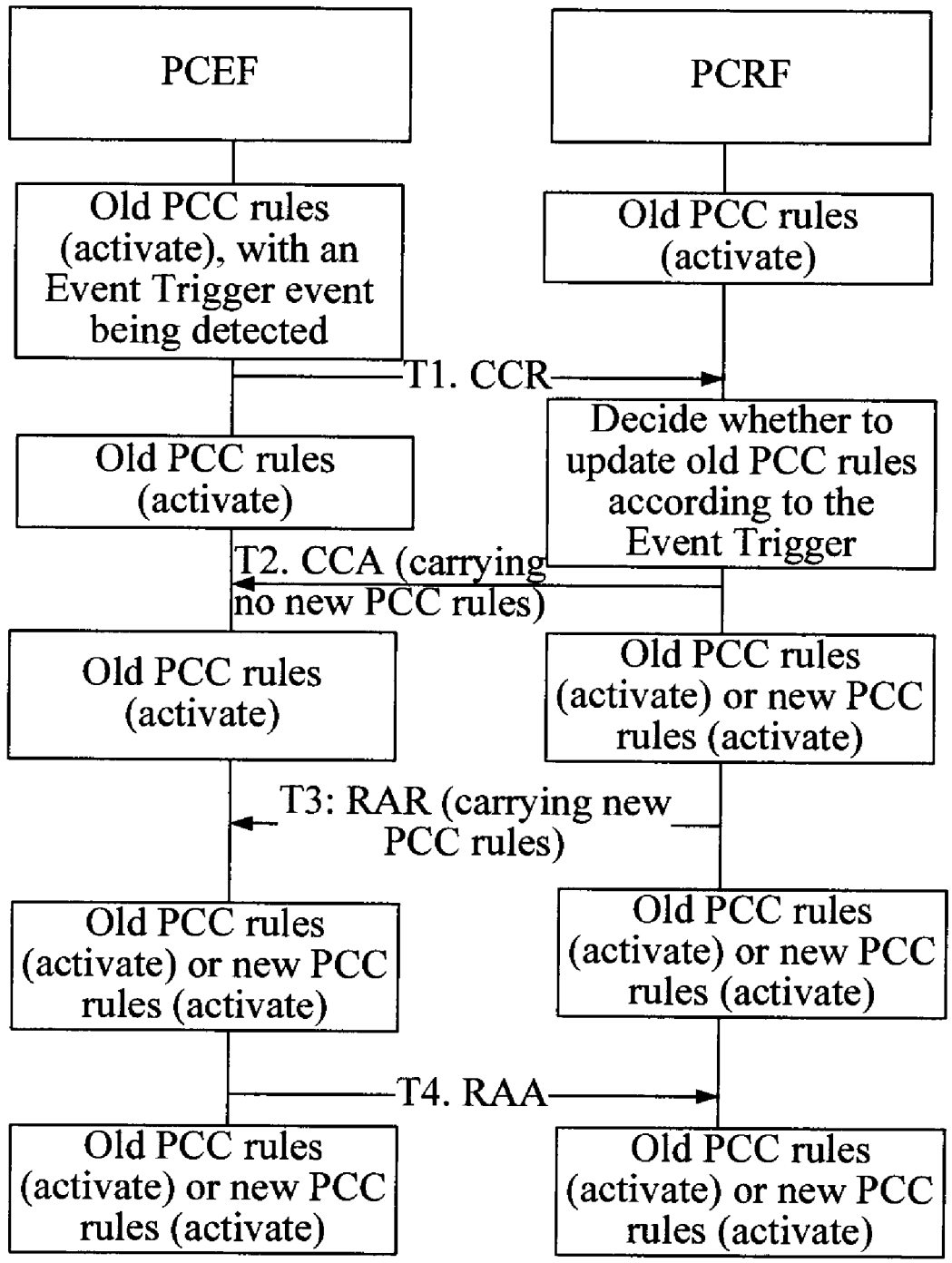
FIG. 6 shows a method for updating PCC rules according to a third embodiment of the present invention.

As shown in FIG. 6, a method for updating PCC rules in the third embodiment of the present invention includes:

Step T1: When an event-trigger event occurs, the PCEF sends a CCR message that carries an event-trigger parameter and a PCC rule delivery request.

Step T2: According to the event-trigger parameter, the PCRF judges whether the activated PCC rules (namely, old PCC rules) need to be updated, and sends a CCA. If the PCC rules need to be updated, the PCRF generates new PCC rules, and the CCA message delivered to the PCEF carries no PCC rules, and a PUSH mode is started.

Step T3: The RAR message delivered to the PCEF carries the new PCC rules. After receiving the RAR message, the PCEF sets the PCC rules (namely, old PCC rules) to a non-active state, executes the new PCC rules carried in the RAR message, and sends an RAA message that carries the execution result to the PCRF. If the PCEF updates the PCC rules unsuccessfully, the PCEF keeps the old PCC rules active, and sends an RAA message that carries the update result to the PCRF.

Step T4: The PCRF processes the stored new and old PCC rules according to the RAA message from the PCEF. If the PCEF updates the PCC rules successfully, the RAA message instructs the PCRF to delete the old PCC rules and activate the new PCC rules; if the PCEF executes the new PCC rules unsuccessfully, the RAA message instructs the PCRF to delete the new PCC rules and activate the old PCC rules to keep consistency between the PCC rules stored in the PCRF and the PCC rules in the PCEF.

FOURTH EMBODIMENT

In the update process, if both new and old PCC rules are stored, the process of obtaining the response made by the PCEF includes the following steps:

It is detected that the PCEF sends no answer message in the preset time.

Figure 7:
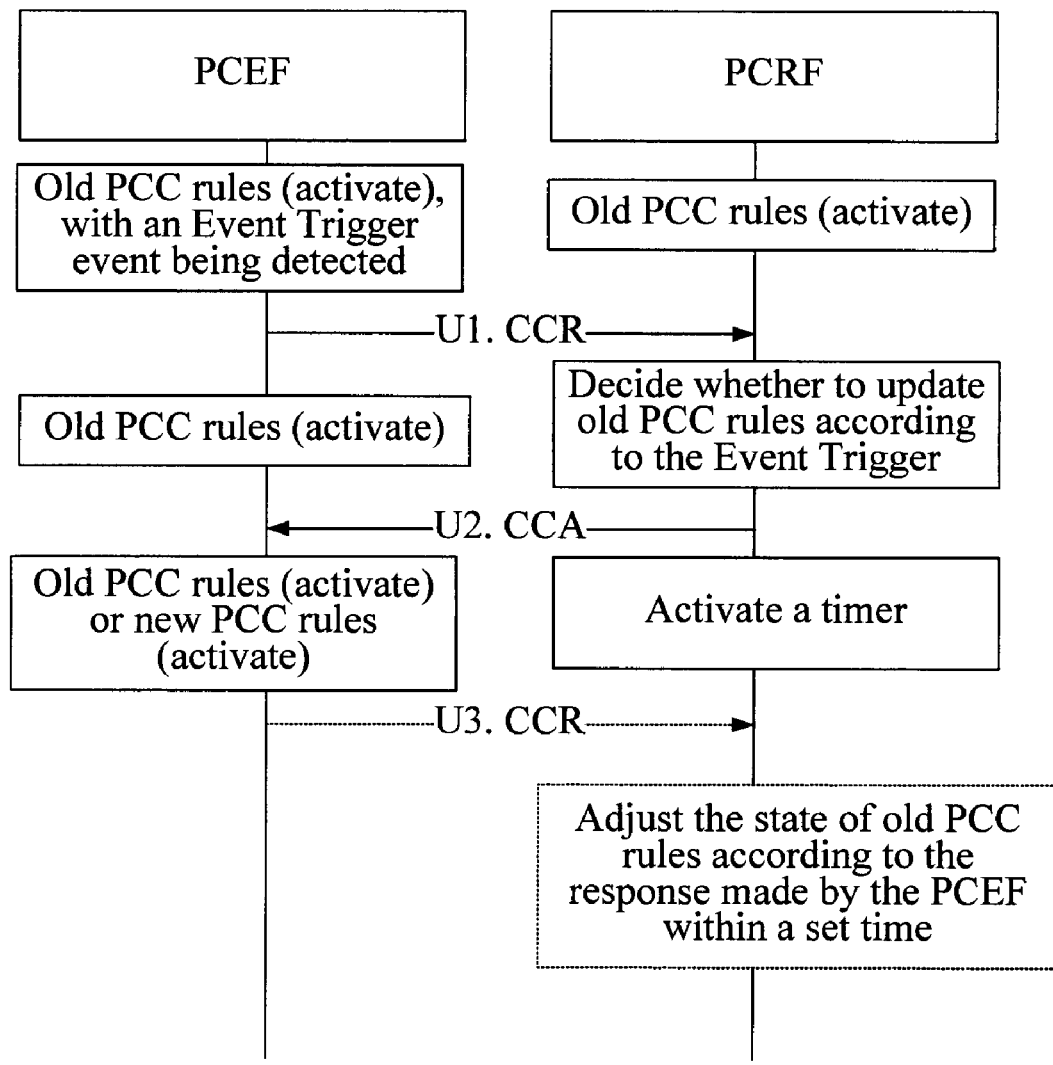
FIG. 7 shows a method for updating PCC rules according to a fourth embodiment of the present invention.

A timer mechanism is applied to enable the PCRF to update the PCC rules in the PULL mode. As shown in FIG. 7, the process includes:

Step U1: When an event-trigger event occurs, the PCEF sends a CCR message that carries an event-trigger parameter and a PCC rule delivery request.

Step U2: According to the detected event-trigger parameter, the PCRF judges whether the current PCG rules (namely, old PCC rules) need to be updated. If the PCC rules need to be updated, the CCA message delivered to the PCEF carries the updated PCC rules (namely, new PCC rules). The PCRF stores both the old PCC rules and the new PCC rules, and starts a timer.

Step U3: If the PCRF receives the new CCR message from the PCEF within the set period of the timer, it indicates that the updated PCC rules are executed unsuccessfully. In this case, the PCRF deletes the updated PCC rules and activates the old PCC rules. If the PCRF receives no new CCR message from the PCEF within the set period of the timer, it indicates that the updated PCC rules are executed successfully. In this case, the PCRF deletes the old PCC rules and activates the new PCC rules. In this way, the PCC rules stored in the PCRF keep consistent with the PCC rules in the PCEF.

In the first, third, and fourth embodiments of the present invention, after the PCEF updates the PCC rules successfully, the PCRF can obtain the response made by the PCEF, adjust the state of the new and old PCC rules stored in the PCRF according to the obtained response, retain the PCC rules which are the same as the PCC rules in the PCEF and delete the PCC rules which are different from the PCC rules in the PCEF. In this way, the PCC rules stored in the PCRF keep consistent with the PCC rules in the PCEF, and the user service runs normally in the process of updating the PCC rules.

In the second embodiment of the present invention, after the PCEF updates the PCC rules unsuccessfully, both new and old PCC rules in the PCEF are in the deactivated state. The PCRF deletes the new and old PCC rules according to the response from the PCEF, re-creates matching PCC rules and delivers them to the PCEF. In this way, the PCC rules stored in the PCRF keep consistent with the PCC rules in the PCEF, and the user service runs normally in the process of updating the PCC rules.

FIFTH EMBODIMENT

In the update process, if mere the new PCC rules are stored, the process of obtaining the response made by the PCEF includes the following steps:

When the PCEF updates the PCC rules unsuccessfully, the PCRF receives the answer message sent by the PCEF. The answer message is a CCR message or RAA message. As soon as the PCRF receives the answer message, the PCEF releases or modifies the IP-CAN bearer corresponding to the old PCC rules to deactivate the old PCC rules.

Figure 8:
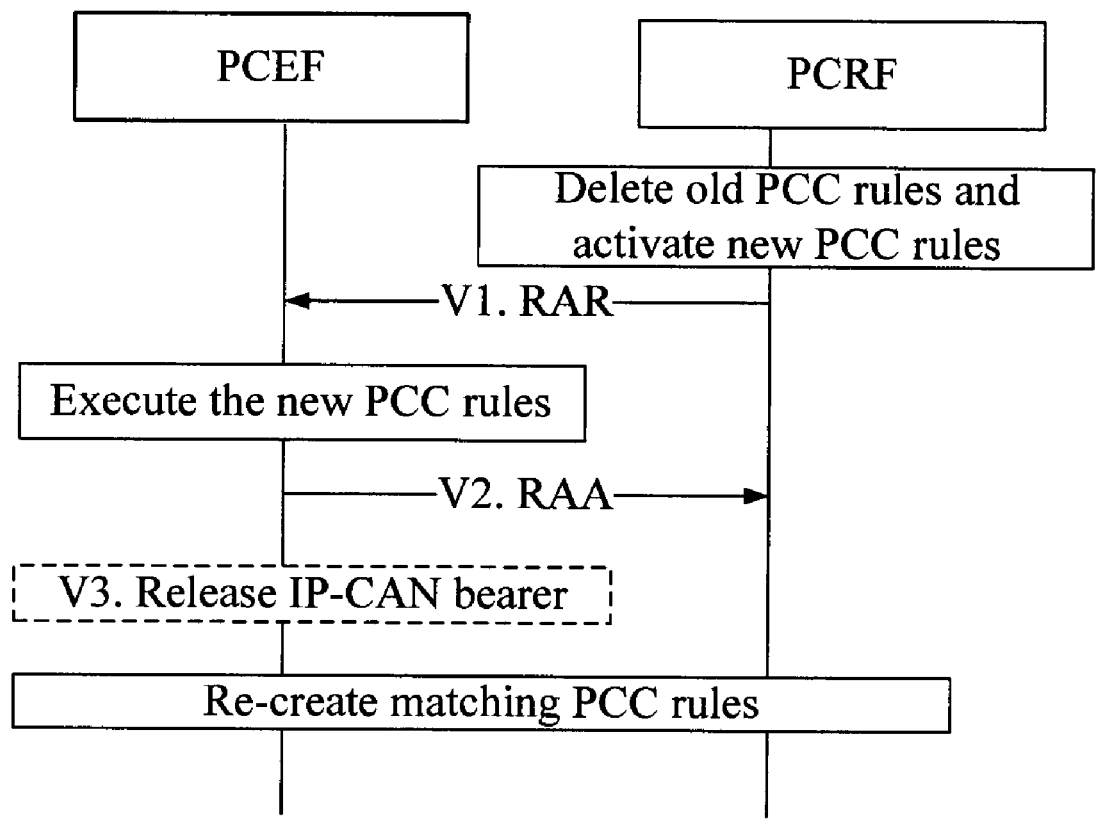
FIG. 8 shows a method for updating PCC rules according to a fifth embodiment of the present invention.

As shown in FIG. 8, in the case that the PCRF does not store the old PCC rules, if the PCEF updates the PCC rules unsuccessfully in the PUSH mode, the PCRF re-creates the PCC rules. The process includes:

Step V1: The PCRF initiates update of PCC rules. The generated new PCC rules are activated, and the old PCC rules are deleted. The PCRF sends an RAR message that carries the new PCC rules to the PCEF.

Step V2: After the PCEF receives the new PCC rules in the RAR message, if the new PCC rules are executed successfully, the PCEF sends an RAA message that carries a successful execution result to the PCRF; if the new PCC rules are executed unsuccessfully, the PCEF returns an RAA message that indicates execution failure to the PCRF, and the process proceeds to step V3.

Step V3: While sending the RAA message to the PCRF, the PCEF deletes or modifies the IP-CAN bearer corresponding to the old PCC rules to deactivate the old PCC rules. The PCRF re-creates matching PCC rules.

No strict sequence relation exists between step V2 and step V3. That is, after the PCEF updates the PCC rules unsuccessfully, the PCEF may also deactivate the old PCC rules first, and then return an RAA message that indicates execution failure.

Although this embodiment deals with the PUSH mode, it is the same with the PULL mode except that the update failure is reported through a CCR message and the old PCC rules are deactivated.

SIXTH EMBODIMENT

In the update process, if merely the new PCC rules are stored, the process of obtaining the response made by the PCEF includes:

When the PCEF updates the PCC rules unsuccessfully, the PCRF receives an answer message from the PCEF. The answer message is a CCR message which carries the old PCC rules.

Figure 9:
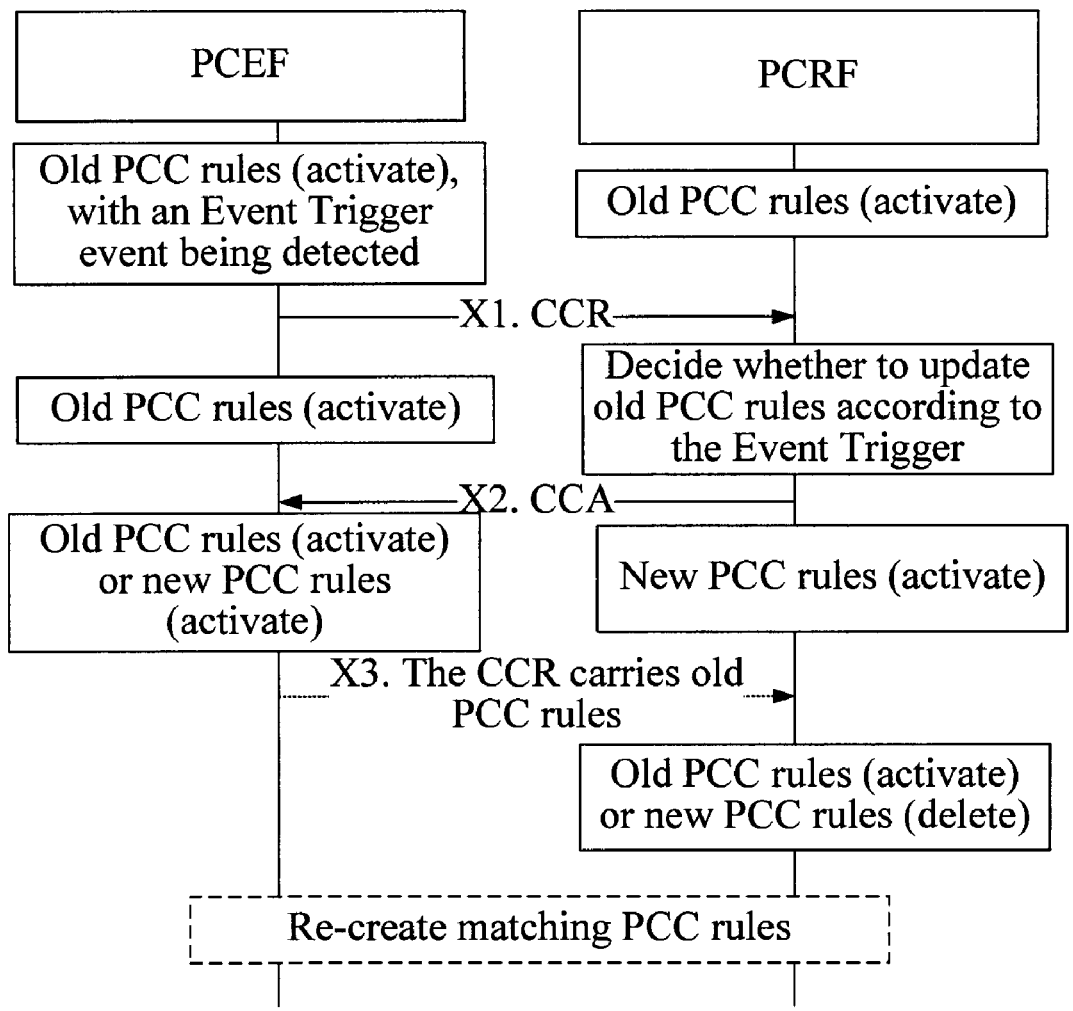
FIG. 9 shows a method for updating PCC rules according to a sixth embodiment of the present invention.

As shown in FIG. 9, in the PULL mode, the PCRF receives the old PCC rules from the PCEF. The process includes:

Step X1: When an event-trigger event occurs, the PCEF sends a CCR message that carries an event-trigger parameter and a PCC rule delivery request.

Step X2: According to the detected event-trigger parameter, the PCRF judges whether the current PCC rules (namely, old PCC rules) need to be updated. If the PCC rules need to be updated, the PCRF deletes the old PCC rules, and the CCA message delivered to the PCEF carries the updated PCC rules (namely, new PCC rules).

Step X3: If the PCEF executes the new PCC rules unsuccessfully, the PCEF sends a CCR message that indicates failure of executing the new PCC rules to the PCRF. The CCR message carries the old PCC rules, instructing the PCRF to delete the new PCC rules and re-create matching PCC rules according to the received old PCC rules.

In the fifth and sixth embodiments of the present invention, when the PCEF executes the PCC rules unsuccessfully, the PCRF reacquires the PCC rules consistent with the PCC rules in the PCEF. It is avoided that the existing user service is interrupted in the case that the PCRF does not store the old PCC rules supporting the existing user service. Therefore, the user service runs normally in the process of updating the PCC rules.

Figure 10:
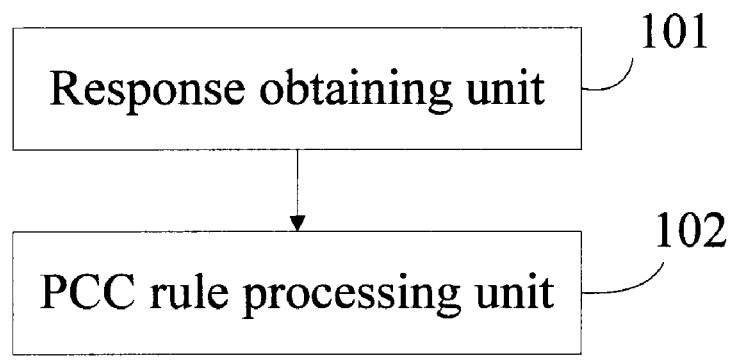
FIG. 10 shows an apparatus for updating PCC rules according to an embodiment of the present invention.

In an embodiment of the present invention, an apparatus for updating PCC rules is provided to ensure normal process of the user service in the process of updating the PCC rules. As shown in FIG. 10, the apparatus includes:

a response obtaining unit 101, configured to obtain a response made by a PCEF after the PCEF updates the PCC rules; and a PCC rule processing unit 102, configured to keep consistency between the created PCC rules and the PCC rules in the PCEF according to the response obtained by the response obtaining unit.

In the preceding embodiment, after the PCEF updates the PCC rules, the PCRF obtains the response from the PCEF through a response obtaining unit, and the PCC rule processing unit processes the PCC rules created and stored in the PCRF according to the obtained response. In this way, the PCC rules stored in the PCRF keep consistent with the PCC rules in the PCEF, it is avoided that the user service is interrupted due to inconsistency between the PCC rules created in the PCRF and the PCC rules in the PCEF in the process of updating the PCC rules in the prior art. The technical solution under the present invention ensures normal process of the user service in the process of updating the PCC rules.

Figure 11:
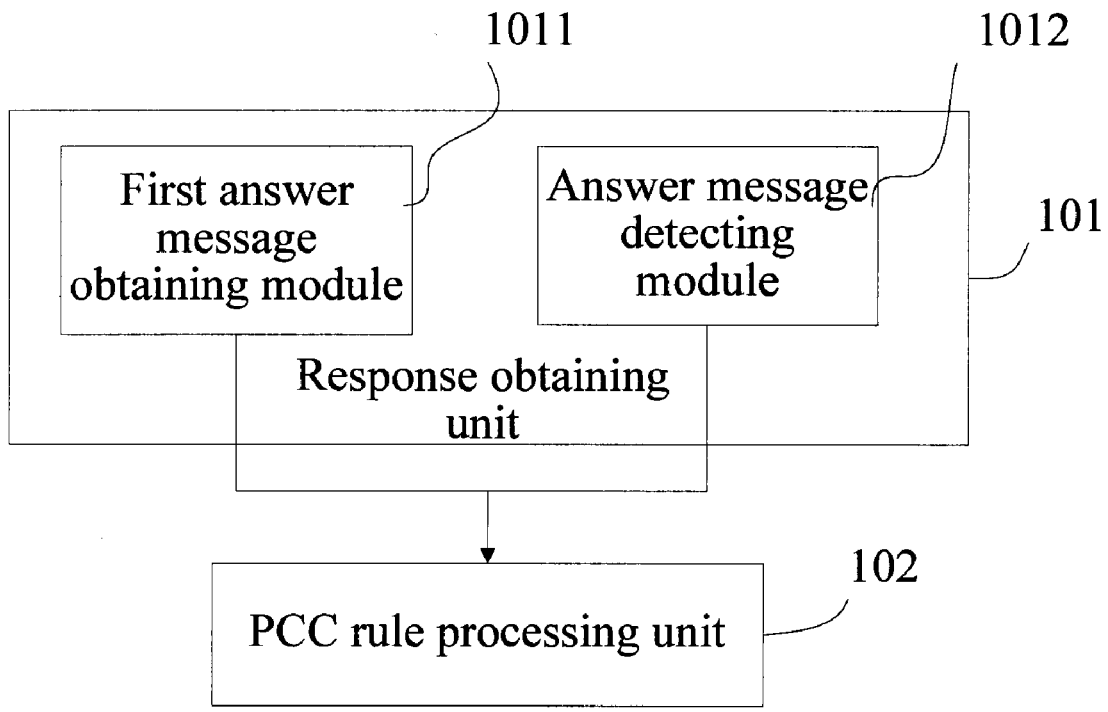
FIG. 11 shows a structure of an apparatus for updating PCC rules according to a first embodiment of the present invention.

In the update process, if both new and old PCC rules are stored, as shown in FIG. 11, the response obtaining unit 101 includes:

a first answer message obtaining module 1011, configured to receive the answer message sent by the PCEF to the PCRF after the PCEF updates the PCC rules successfully.

Alternatively, if a timer mechanism is applied in this embodiment, the response obtaining unit 101 includes: an answer message detecting module 1012, configured to detect whether the PCEF sends no answer message in the preset time. In this case, the PCC rule processing unit 102 includes a first processing module, which is configured to: according to the detection result of the answer message detecting module 1012, retain new PCC rules, delete old PCC rules, and keep consistency between the PCC rules stored in the PCRF and the PCC rules in the PCEF.

The first answer message obtaining module 1011 obtains the response made by the PCEF in the following three scenarios:

The first answer message obtaining module 1011 includes a first receiving module, which is configured to receive a CCR message sent by the PCEF, where the CCR message indicates success of updating the PCC rules. In this case, the PCC rule processing unit includes a first processing module, which is configured to retain new PCC rules and delete old PCC rules according to the CCR message received by the first receiving module.

Alternatively, the first answer message obtaining module 1011 includes a second receiving module, which is configured to receive an RAA message sent by the PCEF. In this case, the PCC rule processing unit 102 is configured to keep consistency between PCC rules stored in the PCRF and the PCC rules in the PCEF according to the RAA message received by the second receiving module.

If the first answer message obtaining module 1011 includes a second receiving module, the first answer message obtaining module further includes:

a third receiving module, configured to receive a CCR message from the PCEF, where the CCR message requests to deliver PCC rules;

a first sending module, configured to: generate new PCC rules according to the CCR message received by the third receiving module, and send a CCA message to the PCEF (in this embodiment, the CCA message carries no PCC rules); and a second sending module, configured to send an RAR message to the PCEF, where the RAR message carries the new PCC rules generated by the first sending module.

Alternatively, the first answer message obtaining module 1011 includes a first receiving and processing module, which is configured to receive a CCR message sent by the PCEF, where the CCR message indicates failure of updating the PCC rules and the PCEF releases or modifies the IP-CAN bearer corresponding to the old PCC rules at the same time of sending the CCR message. In this case, the PCC rule processing unit includes a second processing module, which is configured to delete both new and old PCC rules and re-create matching PCC rules.

Figure 12:
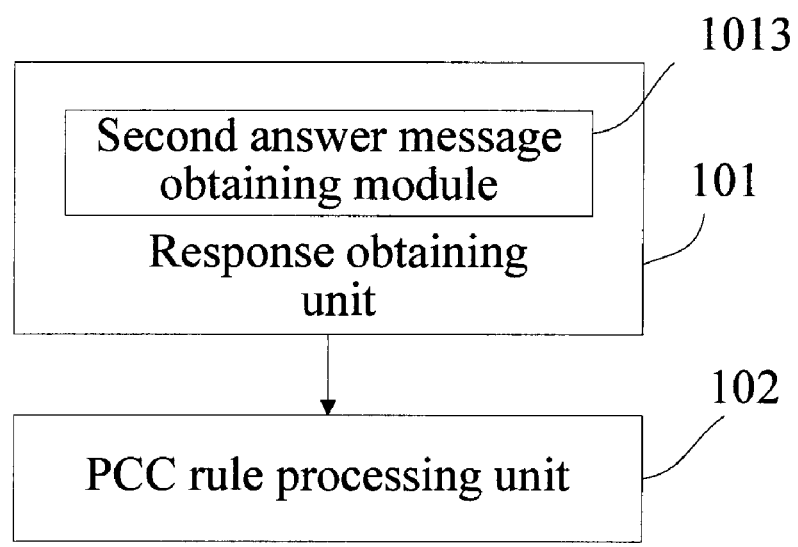
FIG. 12 shows a structure of an apparatus for updating PCC rules according to a second embodiment of the present invention.

In the update process, in the case that only the new PCC rules are stored, as shown in FIG. 12, the response obtaining unit 101 includes a second answer message obtaining module 1013, which is configured to receive an answer message sent by the PCEF after the PCEF updates the PCC rules unsuccessfully.

The second answer message obtaining module 1013 obtains the response made by the PCEF in the following two scenarios:

The second answer message obtaining module 1013 includes a fourth receiving module, which is configured to receive a CCR message sent by the PCEF, where the CCR message carries old PCC rules. In this case, the PCC rule processing unit 102 includes a third processing module, which is configured to: according to the CCR message received by the fourth receiving module, delete the old PCC rules, re-create matching PCC rules, and keep consistency between the PCC rules created in the PCRF and the PCC rules in the PCEF.

Alternatively, the second answer message obtaining module 1013 includes a second receiving and processing module, which is configured to: receive the answer message from the PCEF, where: the answer message is a CCR message or RAA message and indicates failure of updating the PCC rules, and, at the same time of sending the RAR message, the PCEF releases or modifies the IP-CAN bearer corresponding to the old PCC rules to deactivate the old PCC rules. In this case, the PCC rule processing unit 102 includes a fourth processing module, which is configured to delete new PCC rules and re-create matching PCC rules.

Figure 13:
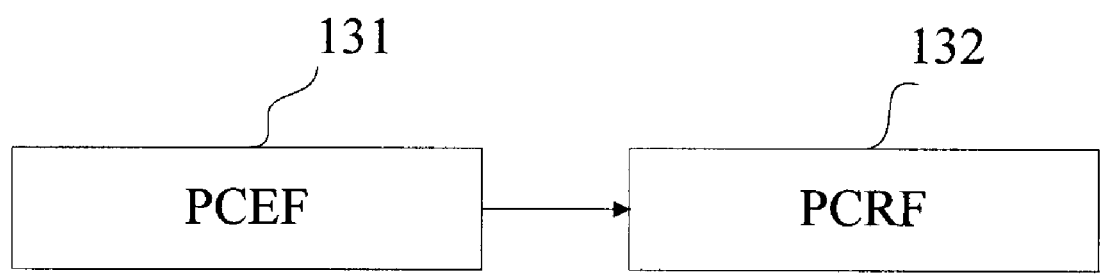
FIG. 13 shows a system for updating PCC rules according to an embodiment of the present invention.

In another embodiment of the present invention, a system for updating PCC rules is provided to ensure normal process of the user service in the process of updating the PCC rules. As shown in FIG. 13, the system includes:

a PCEF 131, configured to send a response to a PCRF after updating the PCC rules; and a PCRF 132, configured to: obtain the response made by the PCEF after the PCEF updates the PCC rules, and keep consistency between created PCC rules and the PCC rules in the PCEF according to the obtained response.

The PCRF includes:

a response obtaining unit, configured to obtain a response made by a PCEF after the PCEF updates the PCC rules; and a PCC rule processing unit, configured to keep consistency between created PCC rules and the PCC rules in the PCEF according to the response obtained by the response obtaining unit.

In the embodiments described above, after the PCEF updates the PCC rules, the PCRF can obtain the response made by the PCEF, and process the PCC rules created and stored in the PCRF according to the obtained response. In this way, the PCC rules stored in the PCRF keep consistent with the PCC rules in the PCEF, it is avoided that the user service is interrupted due to inconsistency between the PCC rules created in the PCRF and the PCC rules in the PCEF in the process of updating the PCC rules in the prior art. The embodiments of the present invention ensure normal process of the user service in the process of updating the PCC rules.

Persons of ordinary skill in the art may understand that all or a part of the steps of the method according to the embodiments of the present invention may be implemented by a program instructing relevant hardware. The program may be stored in a computer readable storage medium.

The above descriptions are merely some exemplary embodiments of the present invention, but not intended to limit the scope of the present invention. Any modifications or variations that can be derived by those skilled in the art should fall within the scope of the present invention.

What is claimed is:

1. A method implemented by a computer comprising a Policy Control and Charging Rules Function (PCRF) communicating with a Policy and Charging Enforcement Function (PCEF), comprising:

receiving, by the computer, a first Credit Control Request (CCR) message for Policy and Charging Control (PCC) rules from the PCEF;

in response to the first CCR message, determining, by the computer, that an old PCC rule needs to be updated, generating a new PCC rule, and sending a Credit Control Answer (CCA) messace carrying the new PCC rule to the PCEF to update a PCC rule stored on the PCEF;

receiving, by the computer, from the PCEF a second CCR message having an indication indicating whether the PCC rule stored on the PCEF is updated successfully with the new PCC rule carried in the CCA message;

if the PCC rule stored in the PCEF is updated successfully with the new PCC rule, updating, according to the second CCR message, the old PCC rule stored in the PCRF with the new PCC rule by deleting the old PCC rule and activating the new PCC rule;

if the PCC rule stored on the PCEF is updated unsuccessfully with the new PCC rule:
- deleting, according to the second CCR message, the new PCC rule stored in the PCRF and activating the old PCC rule, or
- deleting, according to the second CCR message, the new PCC rule and the old PCC rule, creating an additional PCC rule that matches the PCEF, and sending an additional CCA message carrying the additional PCC rule to the PCEF.

2. The method according to claim 1, wherein the method further comprises:
generating the new PCC rule carried in the CCA message according to the first CCR message.

3. The method according to claim 2, further comprising:
deleting the PCC rule stored in the PCRF after receiving from the PCEF the second CCR message.

4. An apparatus comprising:
a memory for storing instructions; and
a processor for executing the instructions to implement a Policy Control and Charging Rules Function (PCRF), the instructions causing the processor to:
receive a first Credit Control Request (CCR) message for Policy and Charging Control (PCC) rules from a Policy and Charging Enforcement Function (PCEF);
in response to the first CCR message, determine that an old PCC rule needs to be updated, generate a new PCC rule, and send a Credit Control Answer (CCA) message carrying the new PCC rule to the PCEF;
receive a second CCR message having an indication indicating whether the PCC rule stored on the PCEF is updated successfully with the new PCC rule carried in the CCA message;
if the PCC rule stored in the PCEF is updated successfully with the new PCC rule, update, according to the second CCR message, the old PCC rule stored in the PCRF with the new PCC rule by deleting the old PCC rule and activating the new PCC rule;
if the PCC rule stored on the PCEF is updated unsuccessfully with the new PCC rule:
- delete, according to the second CCR message, the new PCC rule stored in the PCRF and activate the old PCC rule, or
- delete, according to the second CCR message, the new PCC rule and the old PCC rule, create an additional PCC rule that matches the PCEF, and send an additional CCA message carrying the additional PCC rule to the PCEF.

5. The apparatus according to claim 4, wherein the processor is further configured to:
generate the new PCC rule according to the first CCR message.

6. The apparatus according to claim 5, wherein the processor is further configured to:
delete the PCC rule stored in the apparatus after receiving from the PCEF the second CCR message.

* * * * *

UNITED STATES PATENT AND TRADEMARK OFFICE
CERTIFICATE OF CORRECTION

PATENT NO. : 8,356,107 B2
APPLICATION NO. : 12/908386
DATED : January 15, 2013
INVENTOR(S) : Xu Xia and Yan Li Page 1 of 1

It is certified that error appears in the above-identified patent and that said Letters Patent is hereby corrected as shown below:

In the Claims

Columns 10-11, lines 52-15 - Claim 1 should read as follows:

1. A method implemented by a computer comprising a Policy Control and Charging Rules Function (PRCF) communicating with a Policy and Charging Enforcement Function (PCEF), comprising:
    receiving, by the computer, a first Credit Control Request (CCR) message for Policy and Charging Control (PCC) rules from the PCEF;
    in response to the first CCR message, determining, by the computer, that an old PCC rule needs to be updated, generating a new PCC rule, and sending a Credit Control Answer (CCA) message carrying the new PCC rule to the PCEF to update a PCC rule stored on the PCEF;
    receiving, by the computer, from the PCEF a second CCR message having an indication indicating whether the PCC rule stored on the PCEF is updated successfully with the new PCC rule carried in the CCA message;
    if the PCC rule stored in the PCEF is updated successfully with the new PCC rule, updating, according to the second CCR message, the old PCC rule stored in the PCRF with the new PCC rule by deleting the old PCC rule and activating the new PCC rule;
    if the PCC rule stored on the PCEF is updated unsuccessfully with the new PCC rule:
        deleting, according to the second CCR message, the new PCC rule stored in the PCRF and activating the old PCC rule, or
    deleting, according to the second CCR message, the new PCC rule and the old PCC rule, creating an additional PCC rule that matches the PCEF, and sending an additional CCA message carrying the additional PCC rule to the PCEF.

Signed and Sealed this
Sixteenth Day of April, 2013

Teresa Stanek Rea
*Acting Director of the United States Patent and Trademark Office*